J. E. Larkin,
Auger Handle.
No. 203, Reissued June 17, 1851.
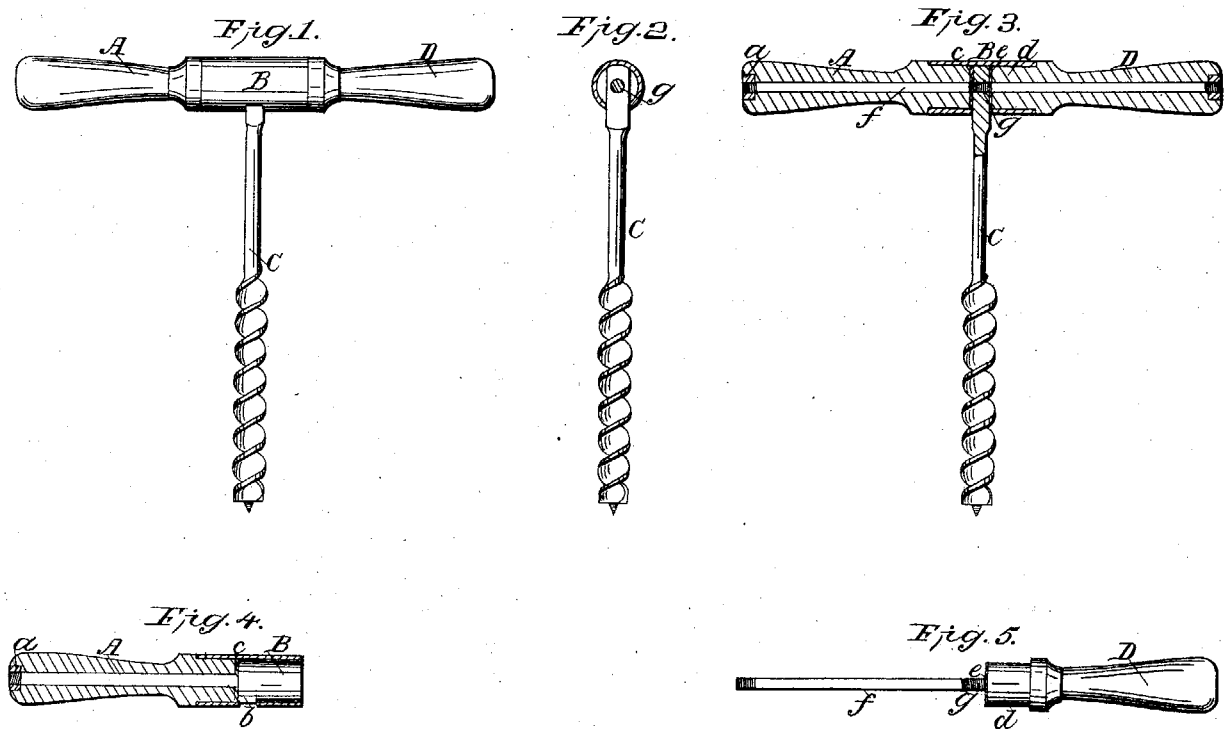
AM. PHOTO-LITHO. CO. N.Y. (OSBORNE'S PROCESS)

UNITED STATES PATENT OFFICE.

JOHN E. LARKIN, OF BALLSTON SPA, NEW YORK; ESTHER L. LARKIN, OF MILTON, NEW YORK, ADMINISTRATRIX OF SAID JOHN E. LARKIN, DECEASED.

METHOD OF ATTACHING AUGERS TO THEIR HANDLES.

Specification forming part of Letters Patent No. 7,785, dated November 19, 1850; Reissue No. 203, dated June 17, 1851.

*To all whom it may concern:*

Be it known that I, JOHN E. LARKIN, of Ballston Spa, in the county of Saratoga and State of New York, have invented certain new and useful Improvement in the Construction of Auger-Handles and the Manner of Securing the Augers therein; and I do hereby declare that the following is a full, clear, and exact description of the same, reference being had to the annexed drawings, forming part of this specification.

Figure 1 represents the auger in the handle. Fig. 2 represents a transverse section through the socket of the handle, the auger being shown entire. Fig. 3 is a longitudinal section through the handle. Fig. 4 is a longitudinal section of that part of the handle which carries the socket. Fig. 5 is a longitudinal section of that part of the handle which carries the bolt or pin.

Similar letters of reference indicate corresponding parts in each of the several figures.

The nature of my invention consists in forming the auger-handle in two parts, one of which carries a hollow metal socket and the other a bolt, which passes through a hole bored in the center of that carrying the socket, and has a male screw at its end fitting into a female screw or nut in the end of that part carrying the socket. The end of that part which carries the pin or bolt is turned to fit the socket, and a space is left between the two ends, each end being faced with a metal plate. The socket is provided with a square or quadrangular hole, which is of the width of the space between the ends of the two parts of the handle. The shank of the auger is parallel and fits the hole in the socket. Its end also fits to the arch of the back or top side of the socket. It is provided with a hole through which the bolt passes. The bolt being screwed into a nut in the socket part of the handle, causes the shank to be held between the metal plates at the ends of the two parts of the handle, and to be so firmly secured that it will never work loose.

To enable others skilled in the art to make and use my invention, I will more fully describe its construction and application.

A, Figs. 1, 2, and 4, represents one half of the handle. It is bored through its entire length, and has a nut, *a*, securely inserted in its outward end. Its inner end is faced with a plate of metal, *c*. (See Figs. 3 and 4.)

B is a metal socket, which is tightly fitted to A, and secured by any convenient means. (See Fig. 4.)

*b* is the hole in the said socket to receive the auger.

C is the auger. Its shank is of quandrangular form and its sides parallel. It fits in the hole *b* in the socket, its end being arched to fit close up to the socket opposite the said hole. The hole in the shank is seen in Figs. 2 and 3, filled by the bolt.

D is the other half of the handle which carries the bolt. The part *d* (see Figs. 3 and 5) is turned to fit the socket B, and is faced at its end with a metal plate, *e*. The part *d* goes into the socket as far as the edge of the hole *b*. *f* is a bolt firmly driven in the part D of the handle, and secured either by a nut or by riveting, so as to prevent its turning. It fits easily in the bore in the part A of the handle, and its end is screwed to fit the nut *a*.

The auger is put into the handle or stock and secured in the following manner: The parts A and D are taken apart and the auger inserted in the hole *b* in the socket, being pushed up to the back side of the socket. The part D of the handle is then taken and its bolt is passed through the hole in the shank and through the part A, and its end screwed into the nut *a*. It is screwed in until the auger is firmly clasped between the plates *c e* on the ends of the two parts of the handle or stock. The end of the auger-shank fitting close to the back side of the socket, and being held in place by the bolt *f*, it is impossible to move it without unscrewing the handle.

What I claim as new in my invention, and desire to secure by Letters Patent, is—

The handle made in two parts, one of which, D, fits in a socket, B, on the other, A, and carries a bolt, *f*, screwed at its end, the said bolt passing through a hole in the auger shank and screwing into a female screw or nut, *a*, in the part A, for the purpose of clasping or firmly holding the auger-shank between the ends of the parts A and D of the handle or stock, substantially in the manner herein described.

Witnesses: JOHN E. LARKIN.

DAVID MAXWELL,

PETER DUN.